(12) United States Patent
Wieduwilt et al.

(10) Patent No.: US 8,156,984 B2
(45) Date of Patent: Apr. 17, 2012

(54) ULTRASONIC WELDING DEVICE, AND PACKAGING MACHINE WITH AN ULTRASONIC WELDING DEVICE

(75) Inventors: Ulrich Wieduwilt, Schwaebisch Gmuend (DE); Heinrich Loecht, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 468 days.

(21) Appl. No.: 12/444,200

(22) PCT Filed: Sep. 6, 2007

(86) PCT No.: PCT/EP2007/059322
§ 371 (c)(1),
(2), (4) Date: Apr. 3, 2009

(87) PCT Pub. No.: WO2008/043615
PCT Pub. Date: Apr. 17, 2008

(65) Prior Publication Data
US 2009/0250171 A1    Oct. 8, 2009

(30) Foreign Application Priority Data
Oct. 6, 2006    (DE) .......................... 10 2006 047 378

(51) Int. Cl.
*B32B 37/00* (2006.01)
(52) U.S. Cl. ..................... 156/378; 156/580.1; 100/291; 53/477

(58) Field of Classification Search ............... 156/64, 156/73.1, 358, 580.1, 580.2, 378; 100/291; 53/471, 477, 478, 485, DIG. 2
See application file for complete search history.

(56) References Cited

U.S. PATENT DOCUMENTS

| 4,462,291 | A | * | 7/1984 | Schulz ..................... 83/368 |
| 4,535,689 | A | * | 8/1985 | Putkowski ............... 100/214 |
| 5,040,357 | A | | 8/1991 | Ingemann |
| 6,679,164 | B2 | * | 1/2004 | Futamura et al. ......... 100/291 |
| 2002/0100535 | A1 | | 8/2002 | Yamazaki et al. |

FOREIGN PATENT DOCUMENTS

| DE | 19526354 C1 | 1/1997 |
| EP | 0344137 A1 | 11/1989 |

* cited by examiner

*Primary Examiner* — James Sells
(74) *Attorney, Agent, or Firm* — Ronald E. Greigg

(57) ABSTRACT

The invention relates to an ultrasonic welding device for welding foil-like materials and includes an ultrasound sonotrode, an anvil, an adjusting unit for adjusting a relative position between the ultrasound sonotrode and the anvil, and a regulating unit which regulates, via the adjustment unit, a width of a working gap between the ultrasound sonotrode and the anvil. The anvil is mounted to be movable with respect to the ultrasound sonotrode on a movable mounting. The adjusting unit has a first wedge element connected to the anvil, a second wedge element, and an actuator. The actuator is connected to the second wedge element, and the second wedge element moves relative to the first wedge element to execute a position change of the anvil relative to the ultrasound sonotrode.

20 Claims, 1 Drawing Sheet

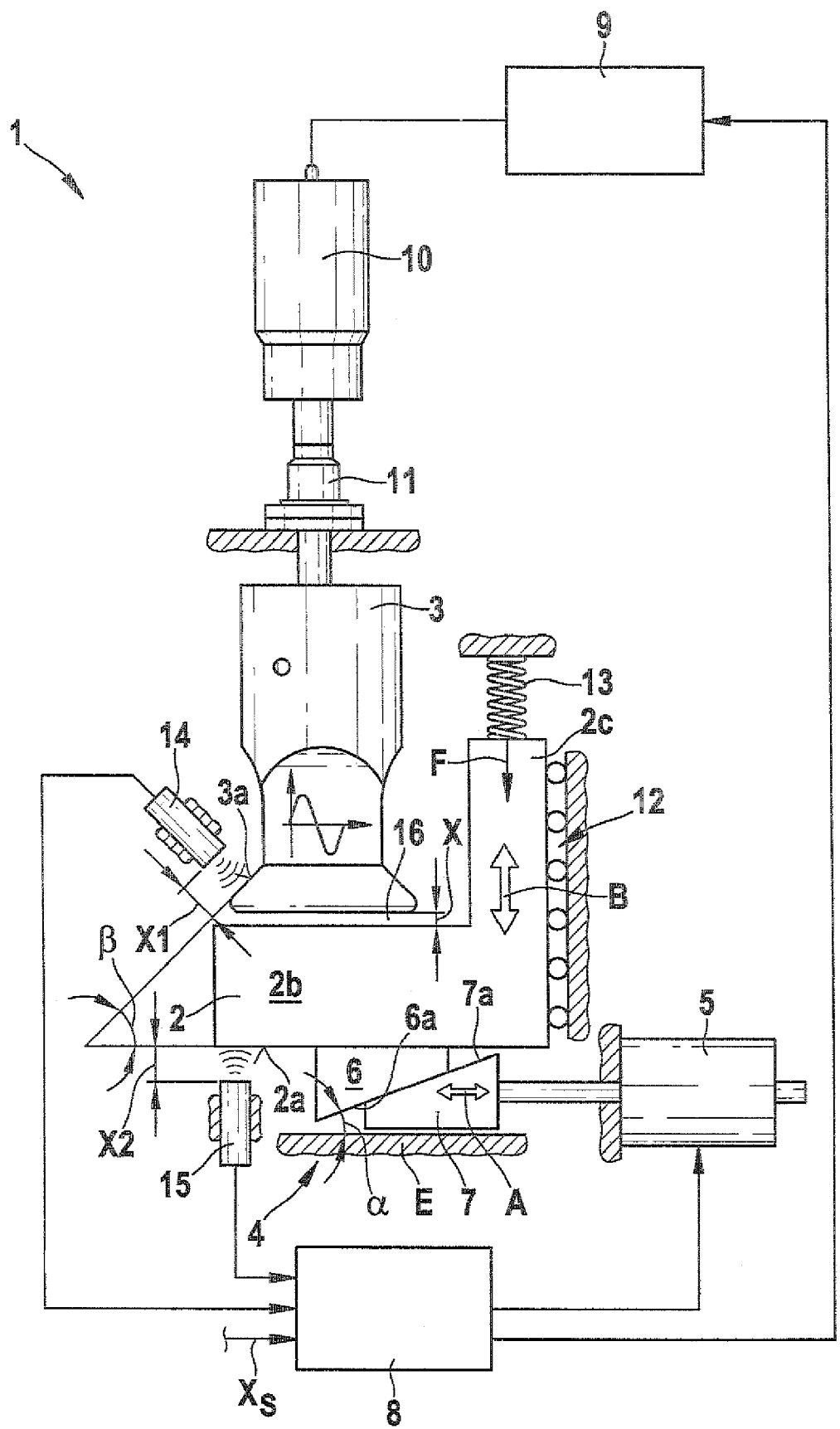

ULTRASONIC WELDING DEVICE, AND PACKAGING MACHINE WITH AN ULTRASONIC WELDING DEVICE

CROSS-REFERENCE TO RELATED APPLICATION

This application is a 35 USC 371 application of PCT/EP 2007/059322 filed on Sep. 6, 2007.

BACKGROUND OF THE INVENTION

1. Field of the Invention

The present invention relates to an ultrasonic welding device for welding films and in particular for welding longitudinal and/or transverse seams of bag packages, as well as to a packaging machine having such an ultrasonic welding device.

2. Description of the Prior Art

From the prior art, ultrasonic welding devices are known, particularly for welding plastic films. The ultrasonic welding devices typically include an ultrasonic sonotrode and an anvil, and a working gap is formed between the ultrasonic sonotrode and the anvil and the films to be welded are passed through it. A constant working gap between the ultrasonic sonotrode and the anvil is decisive for the quality of the welded seam. Because of the heat produced for instance in processing, the dimensions of the components can vary, which can have effects on the width of the working gap. An overly narrow working gap, however, typically worsens the material processing and can lead to damage to the films to be welded and the anvil. If the gap is too wide, an unacceptable weld seam quality is the result. From German Patent DE 195 26 354 C1, an ultrasonic welding device is known which has a sensor for determining a working gap width. A sonotrode is fastened in a mount, and the mount can be adjusted relative to the anvil via a separate adjusting device. However, this known device is very complex in its construction and expensive to produce. Moreover, this device requires a large amount of space, so that its use in packaging machines in particular necessitates a large amount of installation space for the machine.

ADVANTAGES AND SUMMARY OF THE INVENTION

The ultrasonic welding device of the invention has the advantage over the prior art that with its simpler construction and its ability to be produced at a lower cost, a constant width of a working gap can be assured. As a result, a very good welding quality can be obtained. In particular, by means of the ultrasonic welding device of the invention, not only plastic films but metal-coated films, for instance for packaging foods, can be safely welded. This is attained according to the invention in that the ultrasonic welding device includes an ultrasonic sonotrode, an anvil, an adjusting device for adjusting a relative position between the ultrasonic sonotrode and the anvil, and a regulating device for regulating a width of a working gap. The adjusting device has a first wedge element, connected to the anvil, and a second wedge element, connected to an actuator. By a relative motion of the second wedge element to the first wedge element, a motion of the anvil in the direction of the gap width can be attained, so that, monitored by the regulating device, a constant width of the working gap can be assured. The ultrasonic welding device of the invention is especially simply and sturdily constructed. By the use of two wedge elements, very precise regulation of the gap widths can also be accomplished.

Preferably, the anvil is prestressed by means of an elastic element. The elastic element is preferably a compression spring, such as a spiral spring. As a result, freedom of play can be assured in particular between the first and second wedge elements of the adjusting device.

A bearing of the anvil is also preferably realized by means of a roller bearing, in particular by means of balls or rollers. As a result, simple and easy movability of the anvil is furnished.

Also preferably, the ultrasonic welding device includes a first spacing sensor and a second spacing sensor. The two spacing sensors are each disposed in stationary fashion. The first spacing sensor determines a first spacing between the first spacing sensor and the ultrasonic sonotrode, and the second spacing sensor determines a second spacing between the second spacing sensor and the anvil. The regulating device calculates the actual width of the working gap based on the first and second spacings.

For regulating the width of the working gap, the regulating device preferably actuates the actuator and/or regulates a supply of electrical current to the ultrasonic sonotrode.

Preferably, a first measuring surface is provided on the ultrasonic sonotrode, at which the first spacing sensor measures the first spacing, and a second measuring surface is also provided on the anvil, at which the second spacing sensor measures the second spacing. The two measuring surfaces are disposed at a predetermined angle to one another. Thus measuring the width of the working gap is done indirectly, via a measurement of the positions of the ultrasonic sonotode and of the anvil.

The actuator of the adjusting device is preferably a linear actuator. As a result, the actuator can be constructed very simply and inexpensively, for instance as a piston-cylinder unit.

Also preferably, a sloping plane of the first wedge element and a sloping plane of the second wedge element are disposed at an angle of between 1° and 10°, preferably between 3° and 7°, to a base plane. As a result, it can be assured that by means of an only very short stroke, a relatively major change in the width of the working gap can be established.

The invention further relates to a packaging machine, in particular a bag package-making machine, including an ultrasonic welding device in accordance with the present invention. The ultrasonic welding device here is used in particular for welding longitudinal and/or transverse seams of bag packages.

It should be noted that the ultrasonic welding device of the invention can be used not only for welding identical materials but also for welding different materials, such as a plastic film and a metal-coated film.

BRIEF DESCRIPTION OF THE DRAWING

A preferred exemplary embodiment of the invention is described below in conjunction with the accompanying drawing. In the drawing:

The sole FIGURE is a schematic side view of an ultrasonic welding device of the invention.

DESCRIPTION OF THE PREFERRED EMBODIMENTS

Below, in conjunction with FIG. 1, an ultrasonic welding device 1 in accordance with an exemplary embodiment of the invention will be described in detail.

As can be seen from the drawing FIGURE, the ultrasonic welding device 1 includes an anvil 2 and an ultrasonic sonotrode 3. The ultrasonic sonotrode 3 is part of an ultrasound device that includes a generator 9, a converter 10, and an amplitude transformer 11. The amplitude transformer 11 has the function of a booster for the ultrasonic sonotrode 3. Between the anvil 2 and the ultrasonic sonotrode 3, a working gap 16 with a width X is provided. The films to be welded are passed at a constant speed between the ultrasonic sonotrode 3 and the anvil 2 and are welded together by means of the energy input of the ultrasonic sonotrode 3.

The ultrasonic welding device 1 further includes an adjusting device 4, a regulating device 8, a first spacing sensor 14, and a second spacing sensor 15. As can be seen from the drawing FIGURE, the adjusting device 4 includes a first wedge element 6, a second wedge element 7, and a linear actuator 5. The first wedge element 6 is disposed fixedly on the anvil 2. The second wedge element 7 is connected to the linear actuator 5 and can be moved back forth by the linear actuator 5 over a plane E, which is represented by the double arrow A in the drawing FIGURE. The two wedge elements 6, 7 are disposed in such a way that a sloping plane 6a of the first wedge element 6 rests on a sloping plane 7a of the second wedge element 7.

The sloping planes 6a, 7a of the two wedge elements 6 and 7 are disposed at an angle $\alpha$ to the plane E. The angle $\alpha$ is between 1° and 10°, preferably between 3° and 7°, and most preferably at 5°.

The regulating device 8, as is shown in the drawing FIGURE, is connected to both the linear actuator 5 and the generator 9. Moreover, the regulating device 8 is connected to the first spacing sensor 14 and the second spacing sensor 15. The two spacing sensors 14, 15 are disposed in stationary fashion and are embodied as contactless sensors. The first spacing sensor 14 determines a spacing X1 from a measuring surface 3a on the ultrasonic sonotrode 3. The second spacing sensor 15 determines a spacing X2 from a measuring surface 2a of the anvil 2. Here, the measuring surface 3a of the ultrasonic sonotrode 3 is disposed at an angle $\beta$ to the measuring surface 2a of the anvil 2. The angle $\beta$ is preferably between 30° and 60°, and more preferably at 45°.

As also seen from the drawing FIGURE, the anvil 2 is embodied as essentially L-shaped. The first wedge element 6 is disposed on a first leg 2b of the anvil. The first leg 2b is located essentially horizontally and forms a boundary of the working gap 16. A second leg 2c of the anvil 2 is disposed perpendicular to the first leg. The second leg 2c is supported on a vertical bearing 12. The bearing 12 comprises many rollers, to enable a motion of the anvil 2 in the direction of the double arrow B back and forth in the vertical direction. On the end of the second leg 2c, an elastic element 13 in the form of a spiral spring is also disposed. The elastic element 13 exerts a constant pressure force in the direction of the arrow F, in order to assure that the first wedge element 6 is pressed with a predetermined force against the second wedge element 7. As a result, the first wedge element 6 and the second wedge element 7 are kept in a play-free state.

The function of the ultrasonic welding device 1 of the invention is as follows: At least two films, particularly of plastic, that are to be joined are guided at a constant speed into the working gap 16 between the anvil 2 and the ultrasonic sonotrode 3. By the energy input from the ultrasonic sonotrode 3, the films are welded to one another. Now if, for instance, the heat occurring during the welding operation causes a change in length of the components occurs to occur, for instance, of the ultrasonic sonotrode 3, then the working gap 16 becomes smaller. However, the heat-caused change in length has an influence on the position of the measuring surface 3a on the ultrasonic sonotrode 3. Thus the first spacing sensor 14 can detect that the original spacing X1 between the first spacing sensor 14 and the measuring surface 3a has changed. This information is forwarded to the regulating device 8. Simultaneously, the spacing X2 between the second spacing sensor 15 and the measuring surface 2a on the anvil 2 is monitored as well, and a corresponding value is output to the regulating device 8. Based on the measured values from the two spacing sensors 14, 15, the regulating device 8 calculates an actual width of the working gap 16. This width of the working gap 16 is compared in the regulating device 8 with a set-point value $X_s$ for a working gap width.

If there is a difference between the calculated working gap width X and the predetermined width $X_s$, the regulating device 8 activates the linear actuator 5. The linear actuator 5 moves the second wedge element 7 over the plane E in such a way that the first wedge element 6 is moved in the vertical direction, until the width of the working gap 16 again matches the predetermined set-point value $X_s$. The direction of motion of the linear actuator 5 depends on a positive or a negative difference between the actual calculated value for the width of the working gap 16 and the set-point $X_s$. Thus a relative displacement of the second wedge element 7 to the first wedge element 6 takes place. Since the anvil 2 is fixedly connected to the first wedge element 6, and the elastic element 13 exerts a pressure force F in essentially the vertical direction, an immediate relative motion of the anvil 2 relative to the ultrasonic sonotrode 3 is effected. As a result, the width of the working gap 16 is adapted to the desired set-point value. It should be noted that the regulating device 8 permits tolerance ranges of ±1 μm, for instance, before readjusting the width of the working gap 16 takes place. The regulating device 8 is preferably a PI controller. It should be noted that alternatively or in addition, for regulating the working gap 16 via the adjusting device 4, it is also possible for the regulating device 8 to output a signal to the generator 9 in order to effect a change in a supply of electric current from the generator 9 for the ultrasonic sonotrode 3. By this means as well, a change in a relative position of the ultrasonic sonotrode 3 relative to the anvil 2 can be attained.

The ultrasonic welding device 1 of the invention is preferably used in packaging that produce bag packages made of plastic or metal-coated plastic. Since the ultrasonic welding device 1 of the invention is very compact and small, it can easily be used in various packaging machines. The ultrasonic welding device of the invention is especially sturdy because it is composed of relatively simple components, in particular for attaining a relative motion between the anvil 2 and the ultrasonic sonotrode 3. The ultrasonic welding device 1 moreover has very high system rigidity.

Thus the ultrasonic welding device 1 of the invention has an adjusting device 4 that performs an adjustment of a position of the anvil 2, by means of an adjusting motion, executed perpendicular to the direction of motion of the anvil 2, which is attained by means of a relative motion of sloping planes with respect to one another.

The foregoing relates to the preferred exemplary embodiments of the invention, it being understood that other variants and embodiments thereof are possible within the spirit and scope of the invention, the latter being defined by the appended claims.

The invention claimed is:
1. An ultrasonic welding device for welding filmlike materials, comprising:
an ultrasonic sonotrode;
an anvil;

an adjusting device for adjusting a relative position between the ultrasonic sonotrode and the anvil;

a regulating device, which via the adjusting device regulates a width of a working gap between the ultrasonic sonotrode and the anvil; and a bearing moveably supporting the anvil relative to the ultrasonic sonotrode, wherein the adjusting device includes a first wedge element connected to the anvil, a second wedge element, and an actuator, wherein the actuator is connected to the second wedge element and moves the second wedge element relative to the first wedge element in order to execute a change of position of the anvil relative to the ultrasonic sonotrode, wherein a first spacing sensor measures a position of the ultrasonic sonotrode and outputs a measured value to the regulating device, wherein a second spacing sensor measures a position of the anvil and outputs a measured value to the regulating device, and wherein the regulating device calculates a width of the working gap based on the measured values from the first and second spacing sensors.

2. An ultrasonic welding device for welding filmlike materials, including:

an ultrasonic sonotrode;

an anvil;

an adjusting device for adjusting a relative position between the ultrasonic sonotrode and the anvil;

a regulating device, which via the adjusting device regulates a width of a working gap between the ultrasonic sonotrode and the anvil;

a bearing moveably supporting the anvil relative to the ultrasonic sonotrode;

a first spacing sensor, which is disposed in stationary fashion and measures a first spacing from the ultrasonic sonotrode; and a second spacing sensor, which is disposed in stationary fashion and measures a second spacing from the anvil, wherein the regulating device determines a width of the working gap, based on the first and second spacings.

3. The ultrasonic welding device as defined by claim 1, wherein the anvil is prestressed by an elastic element, in particular a compression spring.

4. The ultrasonic welding device as defined by claim 2, wherein the anvil is prestressed by an elastic element.

5. The ultrasonic welding device as defined by claim 1, wherein the bearing of the anvil is a roller bearing.

6. The ultrasonic welding device as defined by claim 2, wherein the bearing of the anvil is a roller bearing.

7. The ultrasonic welding device as defined by claim 1, wherein the regulating device actuates the actuator and/or regulates a supply of current to a generator of the ultrasonic sonotrode, if the calculated width of the working gap deviates from a predetermined set-point value thereof.

8. The ultrasonic welding device as defined by claim 2, further comprising a first measuring surface on the ultrasonic sonotrode, at which the first spacing sensor measures the first spacing, and a second measuring surface on the anvil, at which the second spacing sensor measures the second spacing, wherein the first measuring surface is disposed at an angle to the second measuring surface.

9. The ultrasonic welding device as defined by claim 1, wherein the actuator is a linear actuator.

10. The ultrasonic welding device as defined by claim 1, wherein a sloping plane of the first wedge element and a sloping plane of the second wedge element are disposed at an angle of between 1° and 10° to a base plane.

11. A packaging machine, including an ultrasonic welding device as defined by claim 1.

12. A packaging machine, including an ultrasonic welding device as defined by claim 2.

13. The ultrasonic welding device as defined by claim 3, wherein the elastic element is a compression spring.

14. The ultrasonic welding device as defined by claim 4, wherein the elastic element is a compression spring.

15. The ultrasonic welding device as defined by claim 2, wherein the adjusting device includes a first wedge element connected to the anvil, a second wedge element, and an actuator.

16. The ultrasonic welding device as defined by claim 15, wherein the actuator is a linear actuator.

17. The ultrasonic welding device as defined by claim 15, wherein the actuator is connected to the second wedge element and moves the second wedge element relative to the first wedge element in order to execute a change of position of the anvil relative to the ultrasonic sonotrode.

18. The ultrasonic welding device as defined by claim 2, wherein the regulating device actuates the actuator and/or regulates a supply of current to a generator of the ultrasonic sonotrode, if the determined width of the working gap deviates from a predetermined set-point value thereof.

19. The ultrasonic welding device as defined by claim 1, wherein the first spacing sensor is disposed in a stationary manner and measures a first spacing from a first measuring surface on the ultrasonic sonotrode, the second spacing sensor is disposed in a stationary manner and measures a second spacing from a second measuring surface on the anvil, and the regulating device calculates the width of the working gap based on the first and second spacings.

20. The ultrasonic welding device as defined by claim 19, wherein the first measuring surface is disposed at an angle between 30° and 60° to the second measuring surface.

* * * * *